Patented Apr. 3, 1951

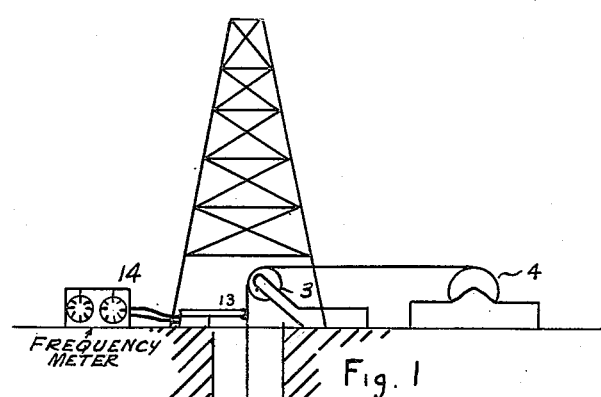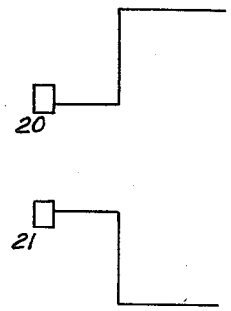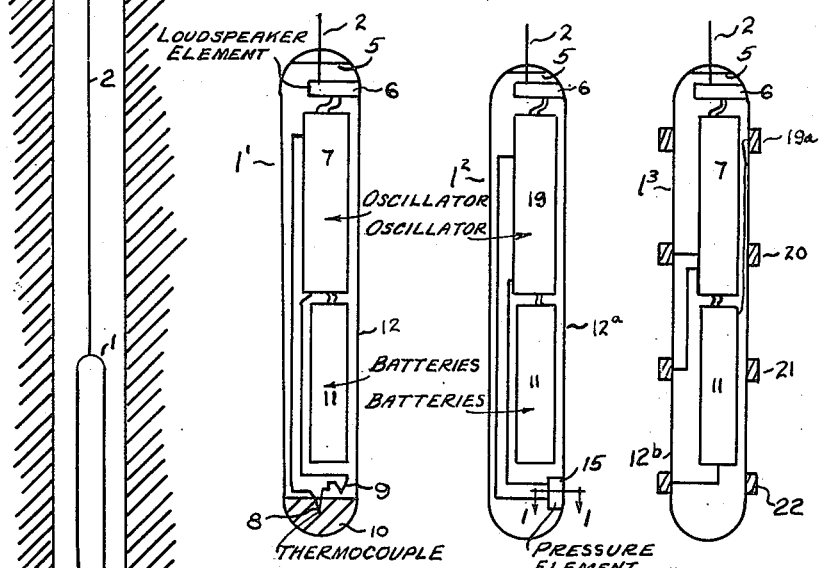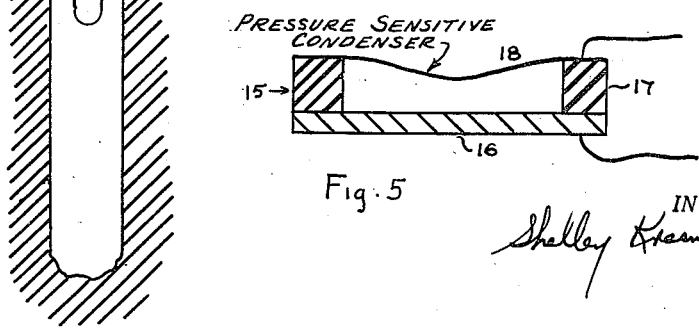

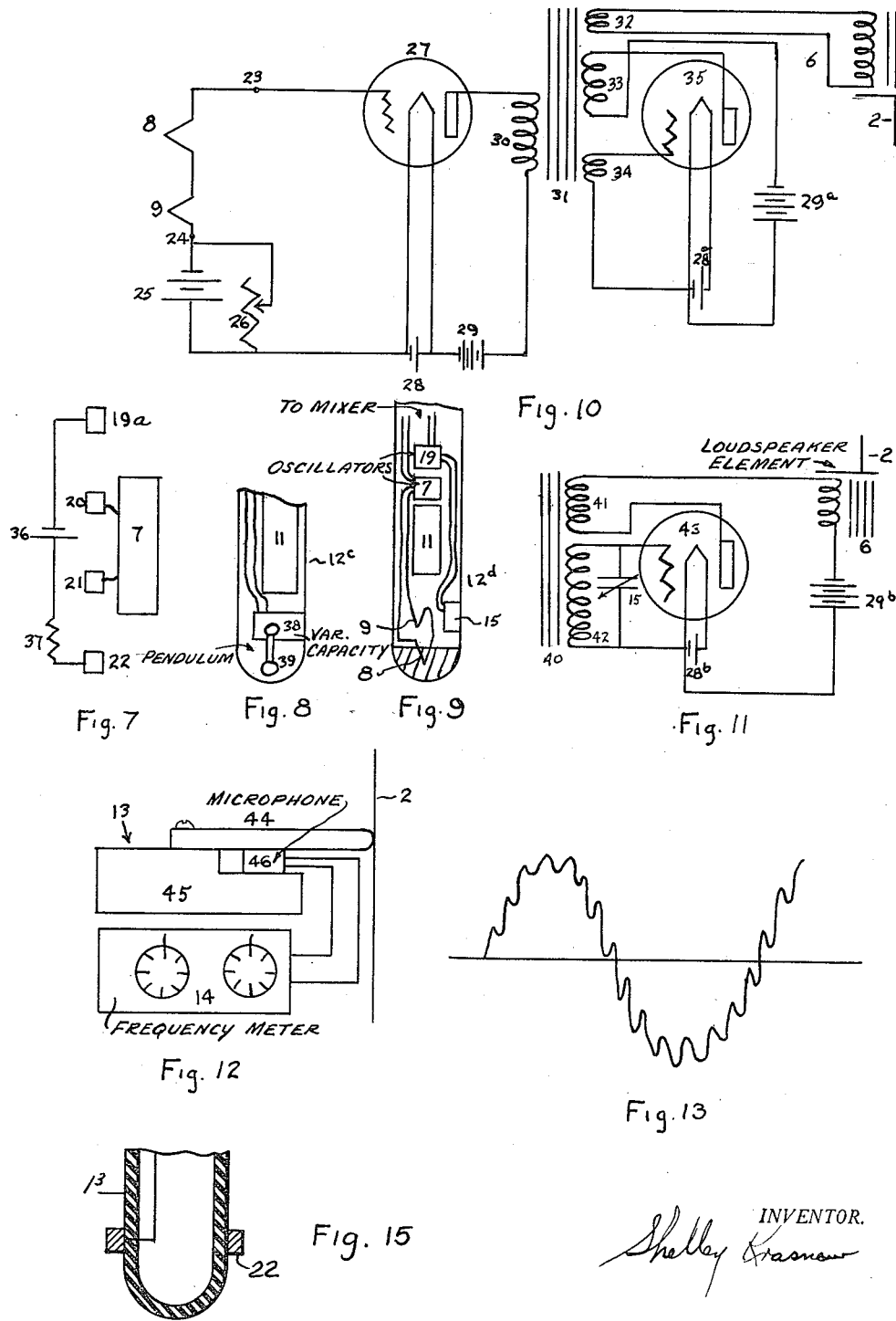

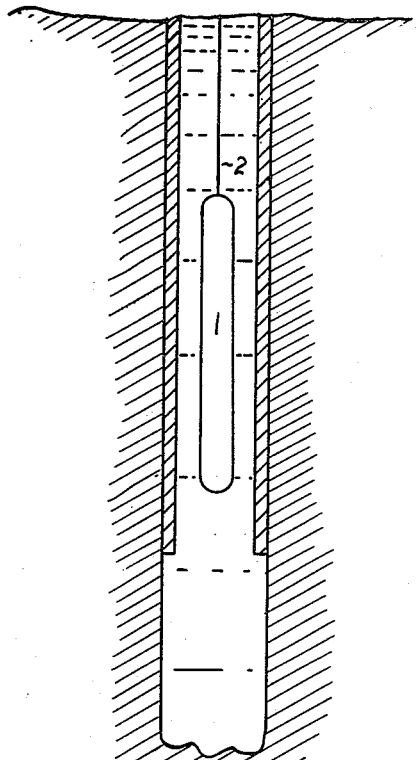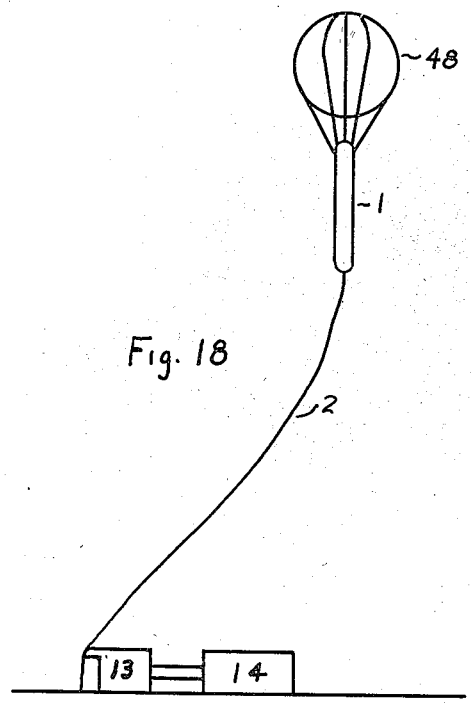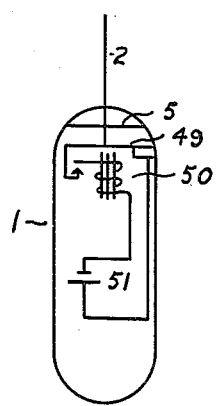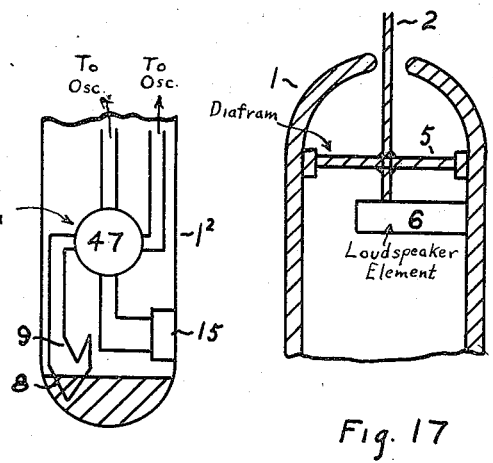

2,547,875

UNITED STATES PATENT OFFICE 2,547,875

APPARATUS FOR TAKING PHYSICAL
MEASUREMENTS IN BOREHOLES

Shelley Krasnow, New York, N. Y., assignor to Schlumberger Well Surveying Corporation, Houston, Tex., a corporation of Delaware Application October 29, 1936, Serial No. 108,312

2 Claims. (Cl. 73—359)

This invention relates to a method and apparatus for making physical measurements in inaccessible locations, and has particular reference to a method and apparatus for making physical measurements in deep bore holes.

An object of the invention is to provide a method and apparatus such that a knowledge of physical conditions at a site may be gained at a considerable distance from the site without the intermediacy of any electric cables. In the particular application mentioned, a knowledge may be gained at the surface of the earth of physical conditions many thousands of feet below the surface.

A further object of the invention is to provide an apparatus and method such that measurements of more than one physical quantity may be made in rapid succession.

A still further object of the invention is to provide an apparatus and method such that two or more physical quantities may be measured simultaneously.

Reference is had to the accompanying drawings in which:

Figure 1 is a schematic view showing the apparatus applied to taking physical measurements in a bore hole.

Figure 2 shows a schematic view of the sound generator used for measuring temperature.

Figure 3 shows a schematic view of a corresponding generator for measuring pressure.

Figure 4 shows a schematic view of a corresponding generator for measuring electrical properties.

Figure 5 shows an enlarged view of the element sensitive to pressure, used in the generator shown in Figure 3, the section being taken across the lines 1—1 in Figure 3.

Figure 6 shows a partial schematic view of the circuit used in the generator shown in Figure 4.

Figure 7 shows a further schematic view of the circuit used in the generator shown in Figure 4.

Figure 8 shows a schematic partial view of a generator for measuring inclination.

Figure 9 shows a schematic partial view of a generator for the simultaneous or successive measurement of temperature and pressure.

Figure 10 shows the wiring diagram of the circuit used in measurement of temperature.

Figure 11 shows the wiring diagram of the circuit used for measuring pressure.

Figure 12 shows schematically the arrangement for detecting vibrations.

Figure 13 shows a modulated wave form suitable for the simultaneous measurement of two physical quantities.

Figure 14 shows a view of the cartridge 1 in a cased borehole, with fluid partially filling the borehole.

Figure 15 shows a portion of the cartridge shown in Figure 4, to show the manner of mounting the conducting rings upon the insulating housing.

Figure 16 shows a further view of the modification shown in Figure 9, showing a time switch for connecting either element.

Figure 17 shows the detail of the upper part of cartridge 1, showing the manner of conducting the wire 2 through the casing.

Figure 18 shows the application of the principles of the invention to the measurement of upper air temperature, in meteorological work.

Figure 19 shows a cartridge with a simple buzzer oscillator, for measuring temperature in wells.

The measurement of certain physical quantities such as pressure and temperature in bore holes, has proved to be of great practical importance. A number of methods have been devised for obtaining these measurements. One method, in common use, is to send down a cartridge containing an apparatus for recording graphically the change in physical conditions as the apparatus is lowered, or in a simpler form, to record the value of a physical quantity at a single depth. Another method much used is to convert the physical quantity being measured into an electrical quantity (if the quantity being measured is not itself, in fact, electrical) and by means of electric cables extending upward from the measuring element make possible the indirect measurement of the physical quantity at the surface.

A disadvantage of the first method named is that it does not permit a ready observation of the quantity being measured while the measurement is being taken. A disadvantage of the second method is that a heavy and expensive electric cable must be used. In some bore holes, mud, salt water, and crude oil exist at different levels. The problem of providing a cable insulation which will withstand all of these, and at the same time be resistant to abrasion, is a difficult one. Further still, the best conductors of electricity are not mechanically strong, so that a high strength wire must be twisted together with the electrical conductors. The additional weight provided by the strengthening wires and insulation is such as to make the cable very much heavier than the object lowered at its end, in the case of deep bore holes.

In the instant invention, the physical quantity being measured is converted into a mechanical vibration or into sound waves; the frequency of either of these varying as a known function of the physical quantity being measured. This can be done by providing a sound or mechanical vibration generator, which is lowered to the depth at which it is desired to take measurements. The frequency of the sound, or the frequency of the mechanical impulses is determined by the magnitude of the quantity being measured. The sound or mechanical vibration generated is conducted to a convenient site through the intermediacy of the member supporting the generator. Alternatively, the sound or mechanical vibration can be transmitted to a convenient site by means of the fluid in the vicinity or through any relatively rigid body such as the casing or drill-pipe in the bore hole. A device for detecting the sound or mechanical vibration, and for measuring its frequency, is placed at any convenient site. By the value of the frequency obtained it is possible to deduce the magnitude of the physical quantity being measured.

Referring now in detail to the drawings, 1 is a cartridge containing the apparatus for generating sound or mechanical vibrations. The cartridges in all modifications are similar, and have been indicated by the reference numerals 1¹, 1², 1³. 2 is a supporting member which may be a wire of high strength material. The member 2 makes contact with a feeler 13, after which it passes over a pulley 3 and is wound up on a reel 4. The feeler 13 acts through the intermediacy of a vibration sensitive device 46 hereinafter more fully described, on a frequency measuring device 14.

If the physical quantity measured is temperature, the apparatus shown in Figure 2 is used. Here a thermo-couple 8 is exposed to the temperature in the well through a heat-conducting medium 10. The thermo-couple 9 is kept at a constant temperature and thus serves as the reference thermo-couple. A thermocouple such as that shown in the U. S. Patent No. 1,818,221, will be found suitable for this measurement. Both of these couples are connected in series and also with the generator 7, the circuit employed in 7 being such that a change in applied E. M. F. will cause a change in frequency as will be later more fully described. A battery compartment 11 serves to hold the batteries which provide the energy for the generator 7. The electrical oscillations generated by the generator 7 are converted into mechanical or sound oscillations by means of a suitable "loud speaker" element 6. To the latter is fastened the end of the member 2. A diaphragm 5 serves to allow the transmission of the vibrations through the walls of the housing 12, and at the same time prevent the flow of fluid into the housing. The loud speaker device 6, is shown schematically and may be any suitable device which will convert electrical oscillations into mechanical ones. It will be noted that the usual loud speaker element utilized in the radio art has its movable element terminating in a wire, or in a clamp capable of clamping a wire. Such a loud speaker element may therefore be used as the element 6, and the wire 2 attached directly to the movable element as above indicated. Because of the ease of utilizing the standard loud speaker element, and because of the close resemblance of the element 6 to the conventional loud speaker, the term "loud speaker element" has been used in this specification to indicate the element 6.

Figure 3 shows an apparatus used for measuring pressure. In this a pressure sensitive element 15 is placed adjacent an outer wall of the cartridge 12ª. The variation in pressure will cause a change in electrical constants of the element 15. This change, acting on the electrical oscillator 19, will cause a change in the frequency of current transmitted to the loud speaker element 6.

Figure 4 shows an apparatus adapted for measuring the electrical properties of the material surrounding the bore hole. In the particular modification shown, the electrical resistivity is measured by means of the "Wenner four-electrode method." The arrangement will in general be similar to that in U. S. Patent No. 1,819,923. The housing 12ᵇ is made of insulating material and four conducting rings, 19a, 20, 21 and 22, are fastened to the outside of the housing. The detail of the mounting of the conducting rings upon the insulating housing is shown more clearly in detail in Figure 15. A current is maintained between the rings 19a and 22 as shown schematically in Figure 7. Here a battery 36 has one pole connected through the ballast resistance 37 to the ring 22, and has its other pole connected to the ring 19a. The E. M. F. between rings 20 and 21, resulting from the passage of the current, is applied to the oscillator 7, as in the apparatus shown in Figure 2.

Figure 8 shows a part view of an apparatus for measuring the inclination of a bore hole. Here the position of a pendulum 39 relative to a support 38 determines an electrical constant in the circuit of a generator such as 19. Thus a change in inclination will cause a change in frequency of the oscillation emitted by generator such as 19. The capacity in this circuit may be altered according to the inclination with the apparatus shown in the U. S. Patent No. 1,999,215, of record.

Figure 9 shows a part view of an apparatus for the simultaneous measurement of temperature and pressure. This is the equivalent of a combination of the elements shown in Figures 2 and 3. It is understood that the frequency change due to the temperature measuring element may be noted on the lowering of the cartridge in the bore hole, and the frequency due to the pressure measuring element noted on the raising of the cartridge. A time switch may be placed within the housing 12ᵈ so as to disconnect the elements 8 and 9 from circuit and connect the element 15 after a predetermined interval. Such a time switch may be of a conventional sort, to connect one circuit and disconnect another at predetermined times. Such a switch is represented schematically as 47 in Figure 16. It will be understood that such a switch can connect the thermocouples 8 and 9 to their oscillator at any predetermined time, and can disconnect the thermocouples and connect the element 15 to its oscillator at any predetermined time. In all other respects, the arrangement is similar to that shown in Figure 9, each measuring element having its corresponding oscillator. In using such an apparatus, a predetermined interval long enough to allow lowering of the cartridge would be chosen. Thus, after the cartridge were lowered to its desired depth, temperature measurements being taken on the way, the time switch would cause the connection of the pressure measuring element and on raising the cartridge pressure would be measured. As alternative to this, pressure and temperature may be measured simultaneously by the use of a modulated mechanical or sound oscillation as will be hereinafter more fully described.

Figure 10 shows a circuit diagram for the unit shown in Figure 2. Here 8 is the measuring and 9 the reference thermocouple. 27 is a vacuum tube of conventional type. In series with its grid are the couples 8 and 9, a biasing battery 25 and balancing rheostat 26, in parallel therewith, and one end of the filament of the tube. A battery 28 serves to heat the filament, in a conventional fashion. In the plate circuit are the coil 30 of the transformer 31, the usual B battery 29, and one end of the filament of the tube. Another coil 34 of the transformer 31, is connected between the grid of the vacuum tube 35, and one end of the filament of the same tube. Another coil 33 of the transformer 31, is connected between the plate of the tube, and the B battery 29$^a$. A lead is connected from one pole of the B battery to one end of the filament, in the conventional fashion. Another coil 32 of the transformer 31, is connected directly to the loud speaker element 6. The operation of the apparatus is as follows: The E. M. F. generated by the difference of temperature between thermocouples 8 and 9 causes a change in the potential of the grid of the tube 27. This causes a corresponding and magnified change in the direct current flowing in the plate circuit of the tube and consequently in the coil 30 of the transformer 31. This in turn causes a change in the flux in the core of the transformer 31. The coils 33 and 34, tube 35, battery 29$^a$ and battery 28$^a$ constitute a generator of electrical oscillations. The frequency of the oscillations generated will be dependent on the saturation of the core of the transformer 31. Thus a change in E. M. F. generated by thermocouple 8 will cause a change in the frequency of the oscillations generated in the oscillatory circuit described above. The oscillations generated will be picked up by the coil 32 of the transformer 31, and converted into mechanical oscillations by means of the loud speaker element 6.

The circuit shown in Figure 11 is that of the generators shown in Figures 3 and 8. It is seen that the circuit is that of a conventional vacuum-tube oscillation generator, the frequency of the oscillations being made variable by the variable condenser 15. In the case of the measurement of pressure, a cell such as that shown in Figure 5 constitutes the element 15. In this a heavy metal plate 16 is kept separated from a thin metal diaphragm 18 by means of an insulating ring 17. An increase in pressure will cause a deflection of the diaphragm 18 and thus bring portions of it closer to the plate 16. If wires are connected respectively to the plate 16 and diaphragm 18, the unit will function as a variable condenser. It is understood that the member 18 forms part of the outer wall of the cartridges 12$^a$ and 12$^d$. In the case of the apparatus shown in Figure 8, the tilt of the pendulum 39 relative to its support 38 may be made to alter the capacity of a member 15 in the circuit shown in Figure 11, and thus cause a change in generated frequency. As before, this electrical oscillation is converted into a mechanical one by means of the loud speaker element 6.

The means of detecting the oscillations is shown in Figure 12. Here the supporting member 2 is allowed to make frictional contact with a semi-flexible member 44, resting on a support 45. The member 44 may be made of metal. Between the member 44 and support 45 is placed a microphone element 46 of conventional type, which is in turn connected to an electrical frequency measuring apparatus shown schematically at 14. In cases where it is desired to measure two physical quantities simultaneously, a modulated wave form is used as shown in Figure 13. Here, one frequency is determined by one of the quantities being measured, the other frequency being determined by the other quantity. Thus the simultaneous measurement of temperature and pressure, or temperature and electrical properties, or any other two quantities, may be made. This factor is of importance in cases where the taking of measurements involves the suspension of drilling activities. At such times the cost of maintaining the drilling equipment and crew idle may amount to serious proportions.

The measurement of the two quantities simultaneously is made in the following fashion. One quantity, such as temperature, is caused to act upon an oscillator such as 7 through the agency of an element such as 8. In the specific case shown, a frequency would be obtained which would be dependent upon the temperature at the bottom of the cartridge. Another element, such as 15, can be caused to act upon still another oscillator such as 19, and can so cause the generation of a frequency dependent upon a quantity such as pressure. The frequency due to temperature, and that due to pressure can be made widely different by proper selection of the constants in the circuits shown in Figures 10 and 11, respectively. The two frequencies can then be mixed, with the standard mixing arrangements used in the radio and acoustic arts, and can thus be made to give a modulated wave such as shown in Figure 13. In the latter showing, a high frequency wave is seen to be superposed upon a low frequency wave. In the present example, the exact frequency of the high frequency component for example, can be determined by the temperature. The low frequency component can have its frequency determined by the pressure. The mixed or modulated electrical wave can then be fed into the loud speaker element 6, which will generate a mechanical wave having the high and low frequency components. The two waves can thus travel simultaneously up the wire 2, or through any other suitable medium for conducting mechanical vibrations. The vibrations can be detected by the device 13, and can be fed into a frequency measuring device such as 14. The two individual frequencies can be separated and measured by any one of the many devices available for measuring frequencies of modulated and carrier components, as utilized in the radio and electronics arts. The result of measurement of one frequency will thus indicate the magnitude of one of the physical quantities, and the result of measurement of the other frequency will indicate the magnitude of the other physical quantity. In the example given, temperature and pressure would thus be indicated simultaneously.

In cases where it is desired to measure electrical properties, the circuit shown in Figure 10 is employed, the thermocouples 8 and 9 being removed and the elements 20 and 21 shown in Figure 6 being substituted and being connected at the points in the circuit 23 and 24. As will be seen by reference to Figure 7, a current will be caused to flow between electrodes 19a and 22. This current, in flowing through whatever medium exists in the borehole, will cause a potential difference between electrodes 20 and 21. This potential difference can be made to react on the circuit shown in Figure 10, and to cause the generation of a frequency proportional to the potential difference. As explained previously, the electrodes 20 and 21 would be connected at the points 23 and 24 in the circuit in Figure 10, the elements 8 and 9 both being removed.

It is obvious that various changes may be made without departing from the scope and spirit of the invention. Thus the element 1 may be used to take measurements of temperature, pressure, and electrical properties, in deep bodies of water. It is further obvious that the method may be used in meteorological work, where a balloon or kite is sent aloft carrying with it sound generators, the frequency of the emitted sound being made proportional to the physical quantity it is desired to measure. This sound may be conveyed to the earth either through a fine metal filament or through air. In the latter case any one of the numerous sensitive devices for detecting sounds in air may be used.

Figure 18 shows a balloon 48, having suspended from it an apparatus such as shown in Figure 2. A wire 2 bears against a detector 13 at the surface of the ground, which detector is connected to the frequency measuring device 14. The temperature in the vicinity of the balloon will cause a mechanical vibration to be generated, whose frequency is related to the magnitude of the temperature. The wire 2, the detector 13, and the frequency measuring device 14, serve exactly the same functions as in the other modifications shown.

It is further obvious that different types of generators than that described may be used. One way in which this might be accomplished is as follows: A standard vibrating reed, or electrically operated tuning fork, of the types commercially available, may be connected to the loudspeaker 6, in place of the oscillating circuit shown in Fig. 11. If a fork or reed made of a metal having an appreciable temperature coefficient of modulus of elasticity is chosen, the pitch of the fork or reed will change with temperature. Thus, the frequency of the current transmitted to the loudspeaker 6, will be a function of the temperature to which the fork or reed is exposed. One or more steps of vacuum tube amplification may be added in a conventional manner to increase the intensity of the sound given off by the loudspeaker 6. Figure 19 shows a simple device which will operate on the principle just described. A cartridge 1 is suspended by a wire 2, passing through a diaphragm 5, and connected to vibrating arm 49 of a conventional buzzer 50. The buzzer will be of the usual type having the armature held by a leaf spring; the most common type of buzzer known. A battery 51 serves to keep the buzzer operating constantly. As is well recognized, the frequency with which the common buzzer will vibrate is dependent upon the natural frequency of the spring and armature system. Since the material forming the spring has a temperature coefficient of modulus of elasticity, an alteration in temperature will alter the natural frequency of vibration. Thus, the temperature of the element 49 will be indicated by the frequency transmitted through the wire 2.

It is further obvious that the sound generated by the generator may be transmitted through the fluid medium in which the generator is immersed. In many cases the cartridge with its enclosed generator will be immersed in liquid. This is particularly true of the modifications of the apparatus shown in Figures 3, 4, and 9. In such cases the sound or mechanical vibrations may be conducted upwards through the liquid, and may be detected and measured at the surface. Where a metallic casing or metallic drill stem exists in a bore-hole under investigation, either may be used to convey the sound or mechanical vibrations. It should be noted that in the method described, it is not necessary that the frequency of the vibrations employed be within the audible range. Supersonic, or sub-sonic vibrations may be used. The frequency indicating apparatus 14 can be connected to a conventional recorder for recording frequency of electrical waves. In this way, a record will be obtained of the frequency at any time, and since the depth of the cartridge 1 can be known at any time by the length of wire reeled from the reel 4, the frequency and depth can be correlated, thus indicating the physical quantity being measured at each depth. Reference is made to the applicant's copending application, Serial No. 517,144 filed January 5, 1944, for "Cartridge for Taking Physical Measurements in Boreholes" and to the applicant's patent No. 2,421,423 which contain claims addressed to subject matter disclosed but not claimed herein, The scope of the invention is defined by the appended claims:

1. In apparatus for surveying a well drilled into the earth, the combination of electrical exploring means adapted to be lowered into a well for providing a continuous current signal the amplitude of which varies as a function of a subject to be investigated in a well, electrical oscillator means movable with said exploring means and incorporating a tuned circuit including fixed inductance means having a magnetically saturable core, winding means for said core connected to receive said continuous current signal so as to vary the flux density in the core and thereby modulate the frequency of the signal output of said oscillator means in accordance with the amplitude of said continuous current signal, and means for transmitting a signal having the frequency of the modulation in said oscillator output signal to the surface of the earth.

2. In apparatus for surveying a well drilled into the earth, the combination of thermocouple means adapted to be lowered into a bore hole to provide a continuous current signal varying in amplitude as a function of temperature in the bore hole, electrical oscillator means movable with said exploring means and incorporating a tuned circuit including fixed inductance means having a magnetically saturable core, winding means for said core connected to receive said continuous current signal so as to vary the flux density in the core and thereby modulate the frequency of the signal output of said oscillator means in accordance with the amplitude of said continuous current signal, means for converting the modulated output of said oscillator means into correspondingly modulated mechanical vibrations, and means for transmitting a signal having the frequency of said mechanical vibrations to the surface.

SHELLEY KRASNOW.

REFERENCES CITED

The following references are of record in the file of this patent:

UNITED STATES PATENTS

| Number | Name | Date |
|---|---|---|
| 478,791 | Gardner | July 12, 1892 |
| 1,313,367 | Anshutz-Kaempfe | Aug. 19, 1919 |
| 1,654,819 | Kinley | Jan. 3, 1928 |
| 1,751,594 | Morgan | Mar. 25, 1930 |
| 1,928,971 | Killon et al. | Oct. 3, 1933 |
| 1,961,007 | Marvin | May 29, 1934 |
| 1,991,658 | Clark et al. | Feb. 19, 1935 |
| 1,999,215 | Smith | Apr. 30, 1935 |
| 2,014,518 | Beverage | Sept. 17, 1935 |
| 2,018,080 | Martienssen | Oct. 22, 1935 |
| 2,038,046 | Jakosky | Apr. 21, 1936 |
| 2,144,215 | Beverage | Jan. 17, 1939 |
| 2,190,950 | Potapenko | Feb. 20, 1940 |
| 2,225,668 | Subkow | Dec. 24, 1940 |
| 2,317,304 | Sohlumberger | Apr. 20, 1943 |
| 2,425,868 | Dillon | Aug. 19, 1947 |

FOREIGN PATENTS

| Number | Country | Date |
|---|---|---|
| 191,265 | Germany | Nov. 5, 1907 |
| 721,629 | France | Dec. 22, 1931 |